US007490965B2

(12) United States Patent
Okada et al.

(10) Patent No.: US 7,490,965 B2
(45) Date of Patent: Feb. 17, 2009

(54) BICYCLE LIGHTING APPARATUS WITH MOUNTABLE DISPLAY

(75) Inventors: Shigekatsu Okada, Sakai (JP); Takuji Masui, Sakai (JP)

(73) Assignee: Shimano, Inc., Sakai-ku, Sakai, Osaka (JP)

( * ) Notice: Subject to any disclaimer, the term of this patent is extended or adjusted under 35 U.S.C. 154(b) by 67 days.

(21) Appl. No.: 10/906,077

(22) Filed: Feb. 2, 2005

(65) Prior Publication Data

US 2005/0180150 A1 Aug. 18, 2005

(30) Foreign Application Priority Data

Feb. 16, 2004 (JP) ............................ 2004-038269

(51) Int. Cl.

| | |
|---|---|
| ***B62J 6/00*** | (2006.01) |
| ***F21V 33/00*** | (2006.01) |
| ***F21V 7/04*** | (2006.01) |
| ***B60Q 1/00*** | (2006.01) |
| ***H04M 1/22*** | (2006.01) |

(52) U.S. Cl. ....................... 362/473; 362/474; 362/549; 362/548; 362/191; 362/253; 362/368

(58) Field of Classification Search ......... 362/473–476, 362/549, 548, 191, 253, 368

See application file for complete search history.

(56) References Cited

U.S. PATENT DOCUMENTS

| | | | | |
|---|---|---|---|---|
| 2,168,939 | A * | 8/1939 | Kraeft | 74/551.8 |
| 4,479,693 | A * | 10/1984 | Uyeda et al. | 439/527 |
| 5,370,412 | A * | 12/1994 | Chou | 280/288.4 |
| 5,644,511 | A * | 7/1997 | McWhorter | 702/148 |
| 5,690,410 | A * | 11/1997 | Lin | 362/473 |
| 5,735,441 | A * | 4/1998 | Fujimoto | 224/420 |
| 6,109,770 | A * | 8/2000 | Choimet et al. | 362/473 |
| 6,281,674 | B1 * | 8/2001 | Huang | 324/174 |
| 6,418,041 | B1 * | 7/2002 | Kitamura | 363/125 |
| 6,430,040 | B1 * | 8/2002 | Masui | 361/683 |
| 6,446,922 | B2 * | 9/2002 | Irie | 248/230.1 |
| 6,988,739 | B2 * | 1/2006 | Guderzo et al. | 280/260 |
| 7,066,293 | B2 * | 6/2006 | Kakizoe | 180/219 |
| 7,200,447 | B2 * | 4/2007 | Campagnolo et al. | 700/17 |
| 2003/0112632 | A1 * | 6/2003 | Forsythe et al. | 362/473 |
| 2003/0160686 | A1 * | 8/2003 | Uno | 340/432 |
| 2004/0000990 | A1 * | 1/2004 | Takeda et al. | 340/432 |

(Continued)

FOREIGN PATENT DOCUMENTS

| | | | |
|---|---|---|---|
| DE | 4337456 | A1 | 5/1995 |

(Continued)

OTHER PUBLICATIONS

European search report for EP 05 00 2551, the European patent application that corresponds to this application, dated May 23, 2006.

*Primary Examiner*—Jong-Suk (James) Lee
*Assistant Examiner*—David J Makiya
(74) *Attorney, Agent, or Firm*—James A. Deland

(57) ABSTRACT

A bicycle lighting apparatus comprises a lighting case structured to be mounted to the bicycle and a lighting element supported by the lighting case. A lighting case mounting unit is disposed on the lighting case and is structured to detachably mount a separate display unit to the lighting case.

27 Claims, 8 Drawing Sheets

U.S. PATENT DOCUMENTS

| | | | | |
|---|---|---|---|---|
| 2004/0105273 | A1 * | 6/2004 | Takeda | 362/473 |
| 2004/0189722 | A1 * | 9/2004 | Acres | 345/866 |
| 2006/0007693 | A1 * | 1/2006 | Grepper | 362/474 |

FOREIGN PATENT DOCUMENTS

| | | | |
|---|---|---|---|
| DE | 20119499 | U1 | 2/2002 |
| DE | 20115816 | U1 | 3/2002 |
| DE | 20119499 | U1 | 3/2002 |
| DE | 20115816 | U1 | 4/2002 |
| DE | 20115825 | U1 | 4/2002 |
| EP | 1270397 | A2 | 1/2003 |
| FR | 2765851 | A1 | 1/1999 |
| TW | 089961 | | 8/1987 |
| TW | 114211 | | 6/1989 |
| TW | 140440 | | 8/1990 |
| TW | 277470 | | 6/1996 |
| TW | 372522 | | 10/1999 |

* cited by examiner

BICYCLE LIGHTING APPARATUS WITH MOUNTABLE DISPLAY

BACKGROUND OF THE INVENTION

The present invention is directed to bicycles and, more particularly, to a bicycle lighting apparatus that can mount a separate display.

Various components are mounted to bicycle handlebars in order to control the operation of the bicycle. Such components include brake levers, transmission control devices such as derailleur operating levers, and headlights for illuminating the road at night. Cycle computers and/or gear indicators also may be mounted to the handlebar in order to electronically control the bicycle transmission and/or to display operating and other information to the rider. A typical cycle computer and/or gear indicator usually comprises a bracket, wherein the bracket is adapted to be mounted to the bicycle handlebar, and a display that is detachably mounted to the bracket.

It is preferable that both the indicator and the headlight be mounted onto the central portion of the handlebar. By so doing, the rider may view the display simply by glancing down slightly while maintaining a forward facing position, and the headlight may illuminate the road directly in front of the rider. Unfortunately, it is difficult to mount both the display and the headlight in the central portion of the handlebar because of the limited space available at that location.

One method of mounting a headlight and a display together is disclosed in German Gebrauchsmusterschrift DE 201 19 499. In this method, a mounting bracket includes a carrier that may be mounted to the handlebar, two arms that extend forward and rearward from the carrier, and a device mounting part at the end of each arm. These device mounting parts are tubular shaped so that a headlight may be strapped to the forward device mounting part, and a cycle computer display may be strapped to the rearward mounting part. As a result, the headlight may illuminate the area directly in front of the bicycle, while the display faces rearwardly toward the rider.

While the above method allows a display and a headlight to be mounted together on the handlebar, the display and the headlight must be separately mounted to the device mounting parts, which can be a cumbersome operation. Also, because the entire structure comprises a number of individual components mounted together, the handlebar tends to have a crowded and cluttered appearance. Also, since the display faces rearwardly, the rider must look down at a significant angle in order to view the display, which can be uncomfortable.

SUMMARY OF THE INVENTION

The present invention is directed to various features of an apparatus for mounting a lighting element and a display to a bicycle. In one embodiment, a bicycle lighting apparatus comprises a lighting case structured to be mounted to the bicycle and a lighting element supported by the lighting case. A lighting case mounting unit is disposed on the lighting case and is structured to detachably mount a separate display unit to the lighting case. Additional inventive features will become apparent from the description below, and such features alone or in combination with the above features may form the basis of further inventions as recited in the claims and their equivalents.

DETAILED DESCRIPTION OF THE EMBODIMENTS

Figure 1:
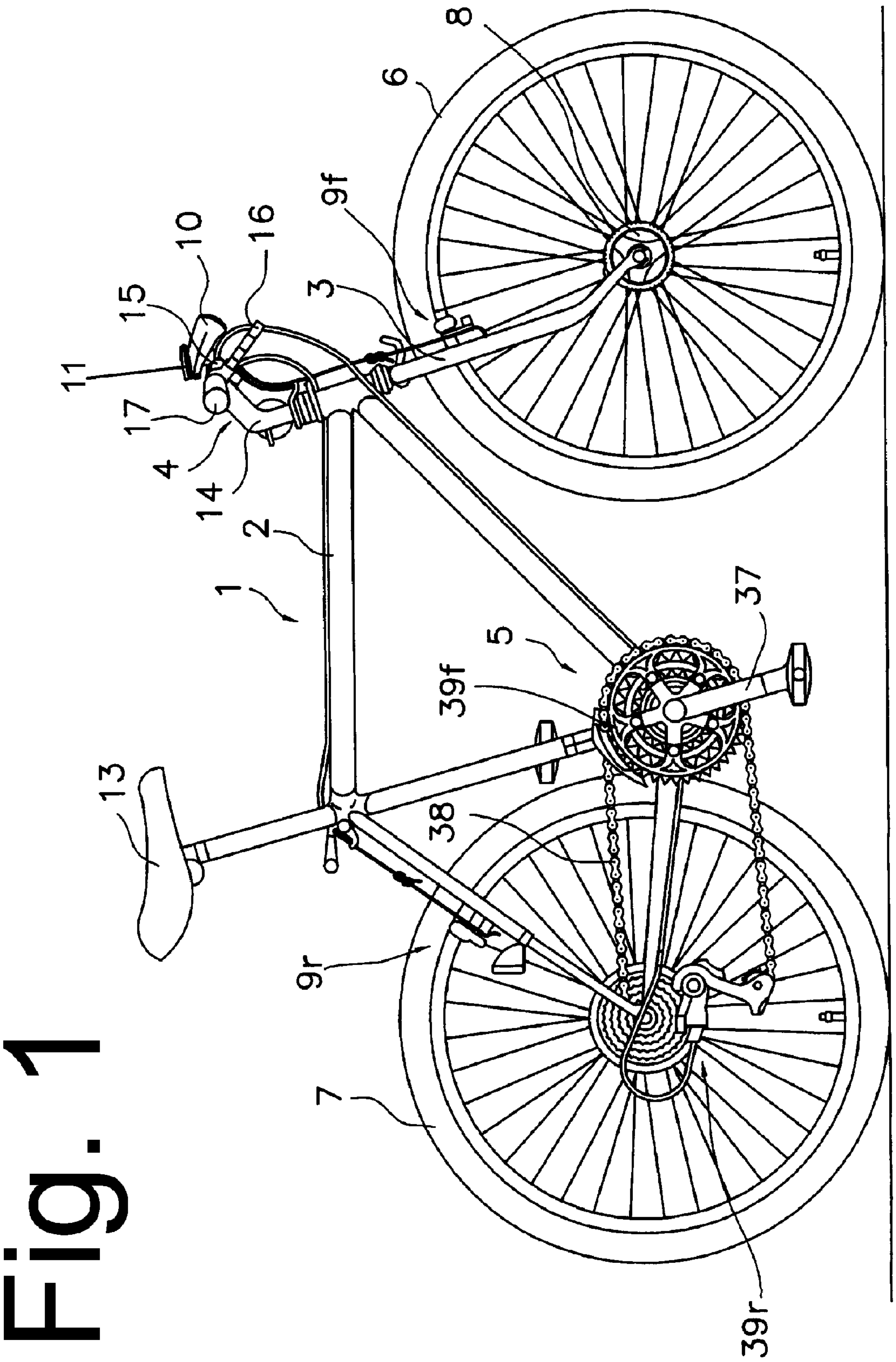
FIG. 1 is a side view of a particular embodiment of a bicycle.
Figure 2:
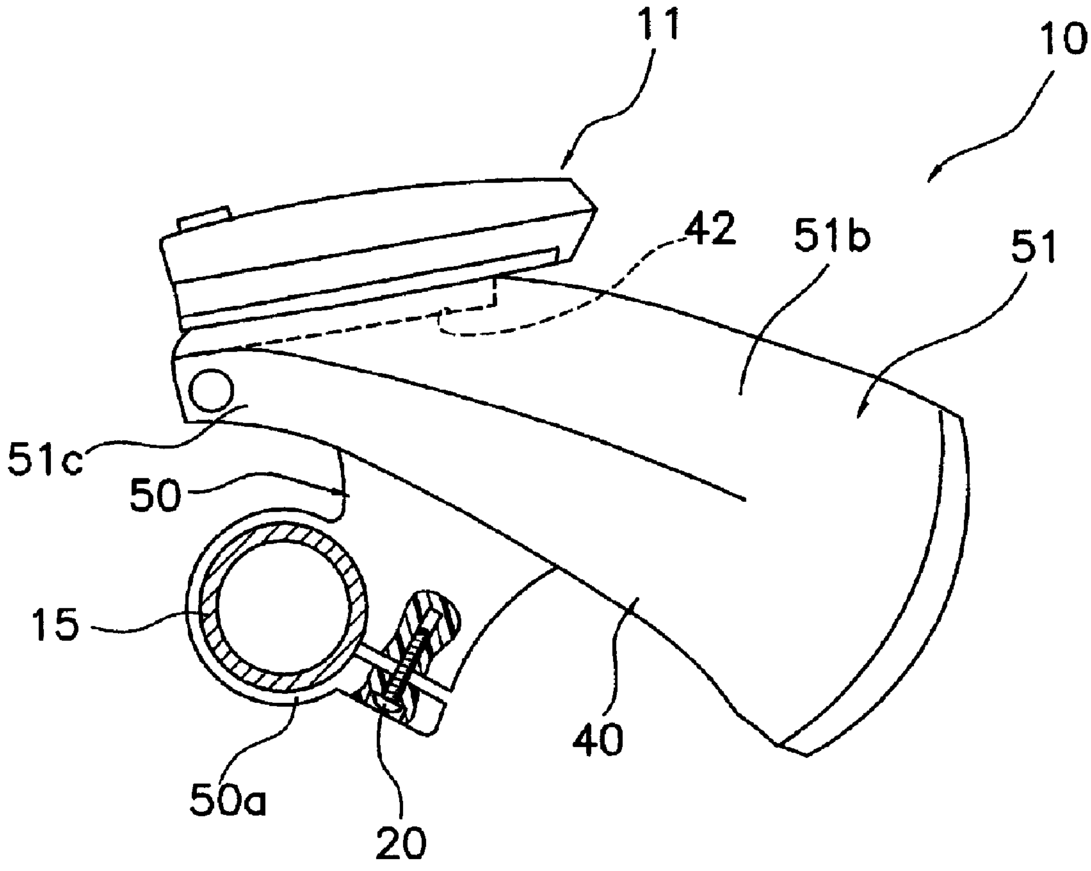
FIG. 2 is a side view of a particular embodiment of a lighting apparatus including a mounted cycle computer.

FIG. 1 is a side view of a particular embodiment of a bicycle 1. Bicycle 1 is a mountain bicycle particularly suited to riding in rough terrain, and it comprises a diamond-shaped frame 2; a front fork 3 mounted to frame 2 for rotation around an inclined axis; a handlebar assembly 4 mounted to the upper part of fork 3; a front wheel 6 including an alternating current generating hub 8 rotatably attached to the lower part of fork 3; a rear wheel 7 rotatably attached to the rear of frame 2; a saddle 13 mounted to the upper middle part of frame 2; and a drive unit 5 comprising a gear crank 37 rotatably mounted to the lower middle part of frame 2, a chain 38, a front transmission 39*f* and a rear transmission 39*r*.

Handlebar assembly 4 comprises a stem 14 attached to the upper part of front fork 3 and a handlebar 15 attached to the upper part of stem 14. Brake lever assemblies 16 are provided on both ends of handlebar 15 adjacent to grips 17 (only one brake lever assembly 16 is shown in FIG. 1). One brake lever assembly 16 is connected to a front wheel brake 9*f* for braking front wheel 6, and the other brake lever assembly 16 is connected to a rear wheel brake 9*r* for braking rear wheel 7. Transmission shift control devices in the form of derailleur control levers (not shown) are mounted to handlebar 15.

A combined lighting apparatus 10 and cycle computer 11 is mounted to the central portion of handlebar 15. As shown in FIGS. 2-4 and 6, lighting apparatus 10 comprises a lighting case 40 that can be freely attached to or detached from handlebar 15, two lighting elements 49*a* and 49*b* (FIG. 3) supported within lighting case 40 and operated by electricity supplied from a power source such as an alternating current dynamo 19 (FIG. 7) disposed within alternating current generating hub 8, and a lighting case mounting unit 42 disposed on lighting case 40 and structured to detachably mount cycle computer 11 to lighting case 40. A cover 43 (FIG. 6) may be used to cover lighting case mounting unit 42 when cycle computer 11 is not mounted to lighting case mounting unit 42.

Lighting case 40 comprises a bracket 50 and a case body 51. Bracket 50 includes a pair of circular clamps 50*a* structured to be mounted to handlebar 15 on opposite sides of stem 14 through screws 20 in a conventional manner. Case body 51 comprises a pair of branched tubular lighting element housings 51*a* and 51*b* and a controller housing 51*c*. Lighting case mounting unit 42 is formed in a generally rectangular recessed area on the upper surface of controller housing 51*c*. Lighting elements 41*a* and 41*b* are housed within lighting element housings 51*a* and 51*b*, and a lighting control unit 45 (FIG. 7) is housed within controller housing 51*c*. In this embodiment, lighting element 41*a* comprises a xenon bulb, and lighting element 41*b* comprises a plurality of white LED's. In this manner, lighting element 41*a* illuminates distant objects with a narrow angle of illumination, whereas lighting element 41*b* illuminates objects near the front of the bicycle with a wide angle of illumination.

Figure 4:
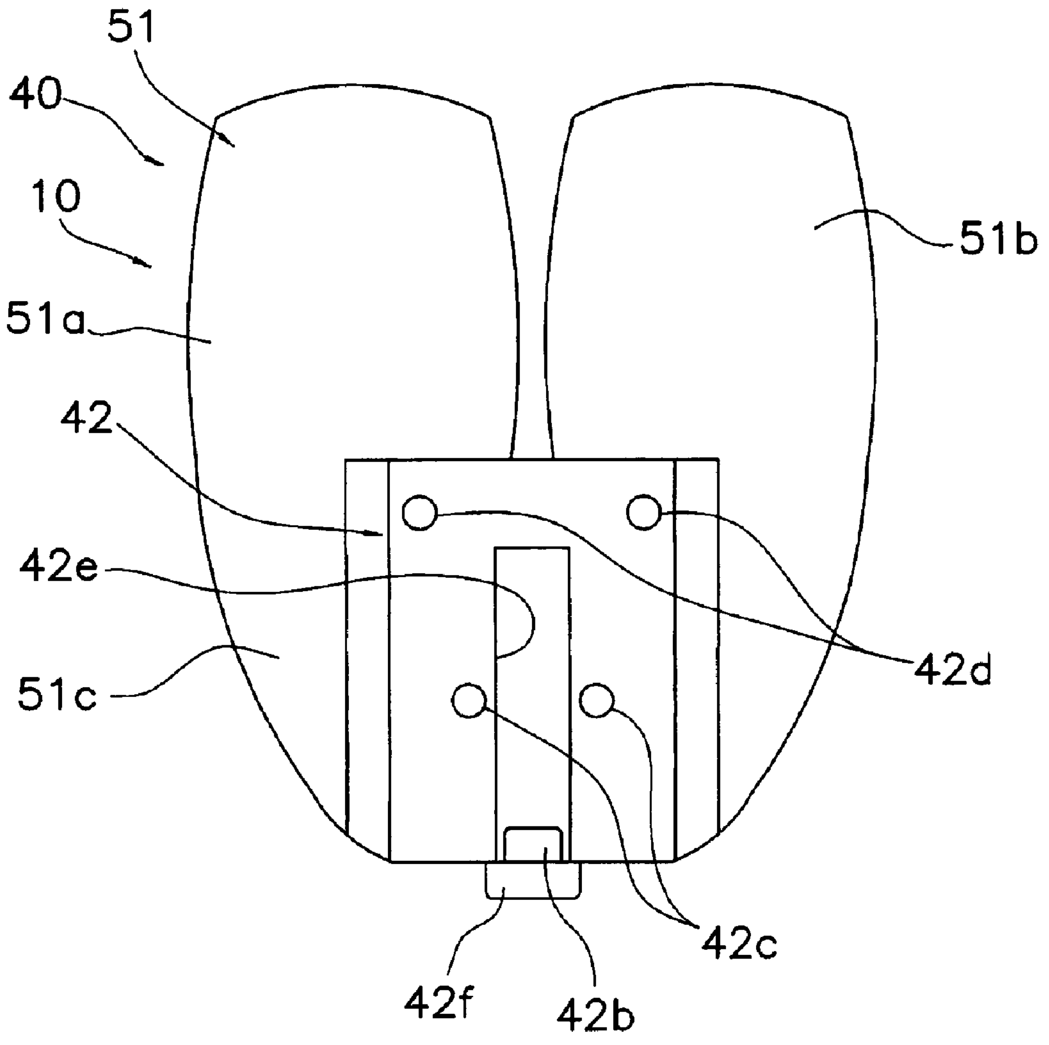
FIG. 4 is a bottom view of the lighting apparatus.
Figure 6:
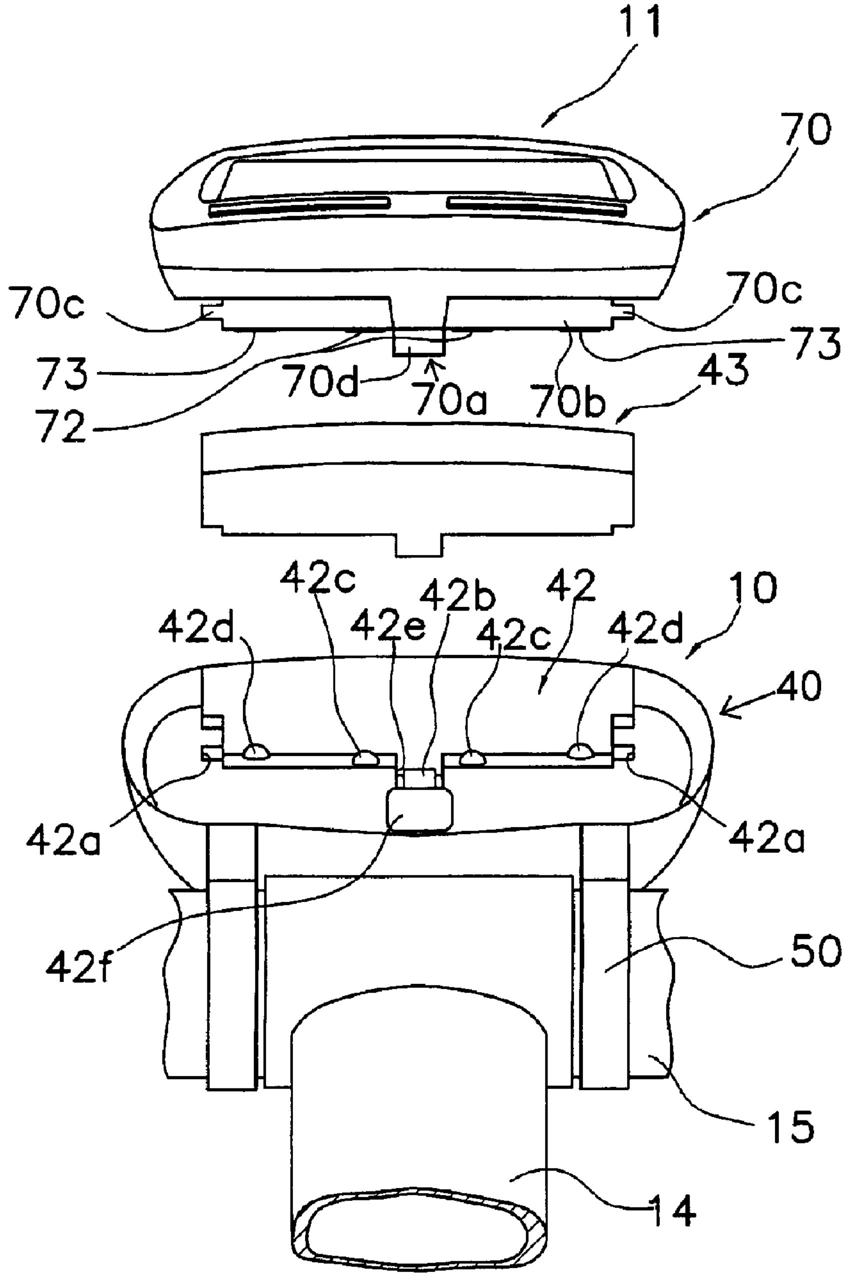
FIG. 6 is an exploded view the lighting apparatus and the cycle computer.

As shown in FIGS. 4 and 6, lighting case mounting unit 42 comprises a pair of forward and rearward extending mounting slits 42*a* disposed on the side walls of the recessed area on the upper surface of controller housing 51, a resilient latch 42*b* disposed in a latch groove 42*e* for latching the rear of cycle computer 11 to lighting case 40, and a latch operating tab 42*f* integrally formed with latch 42*b* for moving latch 42*b* up and down within latch groove 42*e* so that cycle computer 11 may be attached to and detached from lighting case mounting unit 42. The resiliency of latch 42*b* applies a forwardly directed force to help press cycle computer 11 against the front of lighting case mounting unit 42. A pair of hemispherical-shaped exposed electrical data contacts 42*c* and a pair of hemispherical-shaped exposed electrical power contacts 42*d* are disposed at the bottom of lighting case mounting unit 42. Contacts 42*c* straddle latch groove 42*e,* and contacts 42*d* are disposed adjacent to mounting slits 42*a.*

Figure 7:
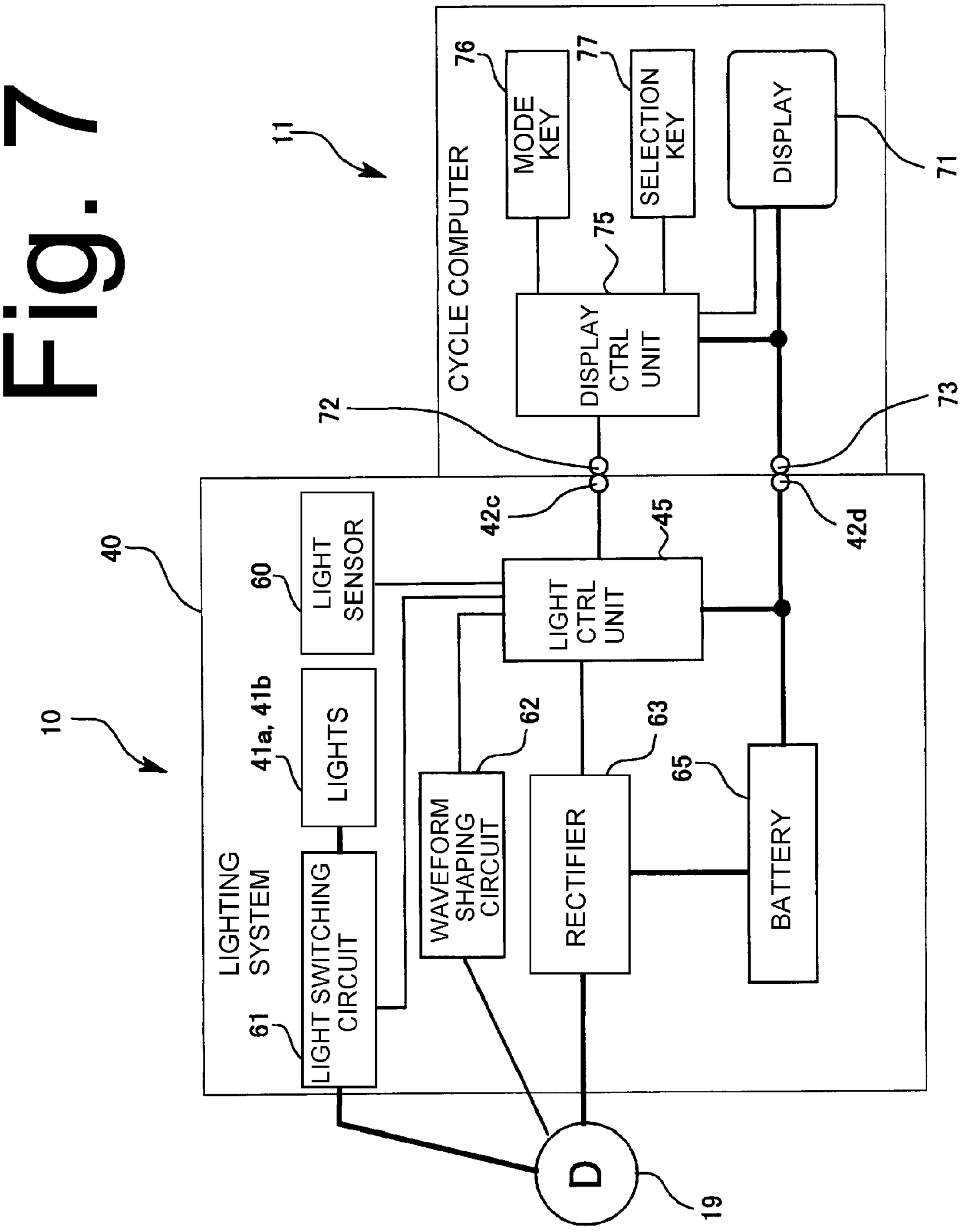
FIG. 7 is a schematic block diagram of a particular embodiment of components of the lighting apparatus and the cycle computer.

FIG. 7 is a schematic block diagram of the components housed within case 40. As noted previously, lighting elements 41*a* and 41*b* and lighting control unit 45 are housed within case 40. Also disposed within case 40 are a light sensor 60 connected to lighting control unit 45; a light switching circuit 61 connected to dynamo 19, to lighting elements 41*a* and 41*b* and to lighting control unit 45; a waveform shaping circuit 62 connected to dynamo 19 and to lighting control unit 45; and a rectifier circuit 63 connected to dynamo 19, to lighting control unit 45 and to a battery 65. Lighting control unit 45 controls the overall operation of lighting elements 41*a* and 41*b,* and it may comprise a microcomputer that operates from current supplied by battery 65. Lighting control unit 45 also generates speed indicating signals from the alternating current signals generated by dynamo 19 in response to the rotation of front wheel 6.

Light sensor 60 senses ambient brightness and provides signals corresponding to the level of ambient brightness to lighting control unit 45. Lighting control unit 45 provides signals to light switching circuit 61 to turn on lighting elements 41*a* and 41*b* (i.e., switch on power from dynamo 19 to lighting elements 41*a* and 41*b*) when the ambient brightness is below a predetermined level. Similarly, lighting control unit 45 provides signals to light switching circuit 61 to turn off lighting elements 41*a* and 41*b* (i.e., switch off power from dynamo 19 to lighting elements 41*a* and 41*b*) when the ambient brightness is above a predetermined level.

Waveform shaping circuit 62 converts the sinusoidal alternating current waveforms from dynamo 19 into pulses that correspond to the rate of rotation of front wheel 6. Lighting control unit 45 converts these pulses into speed indicating signals that can be used by cycle computer 11 and outputs these signals to contacts 42*c*. Rectifier 63 functions as a converter and converts, for example, 12V alternating current signals from dynamo 19 into 5V direct current signals and supplies these signals to battery 65. Battery 65 may comprise a capacitor or other power storage element, and it provides electrical power to lighting control unit 45 and to contacts 42*d.* Lighting control unit 45 monitors the charge level of battery 65 and provides control signals to rectifier 63 to prevent rectifier 63 from overcharging battery 65.

Figure 3:
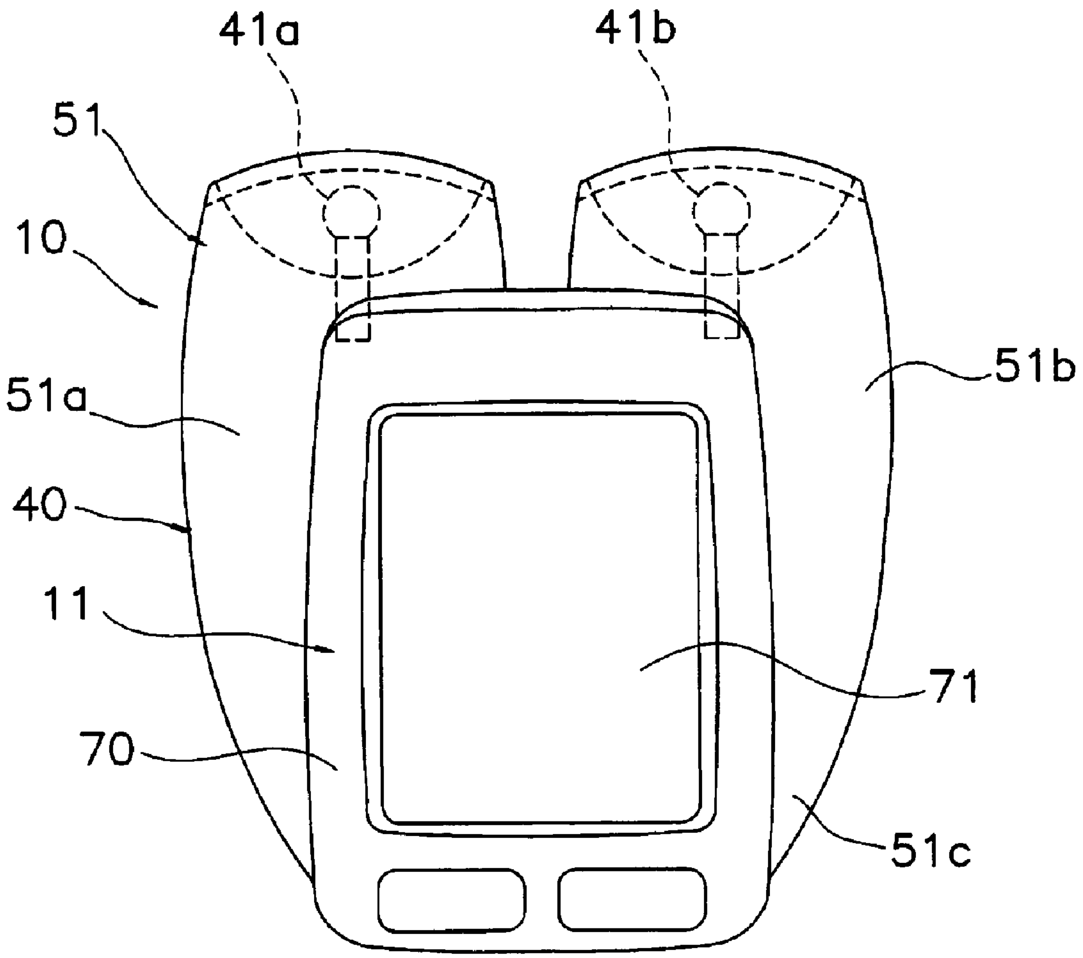
FIG. 3 is a top view of the lighting apparatus.
Figure 5:
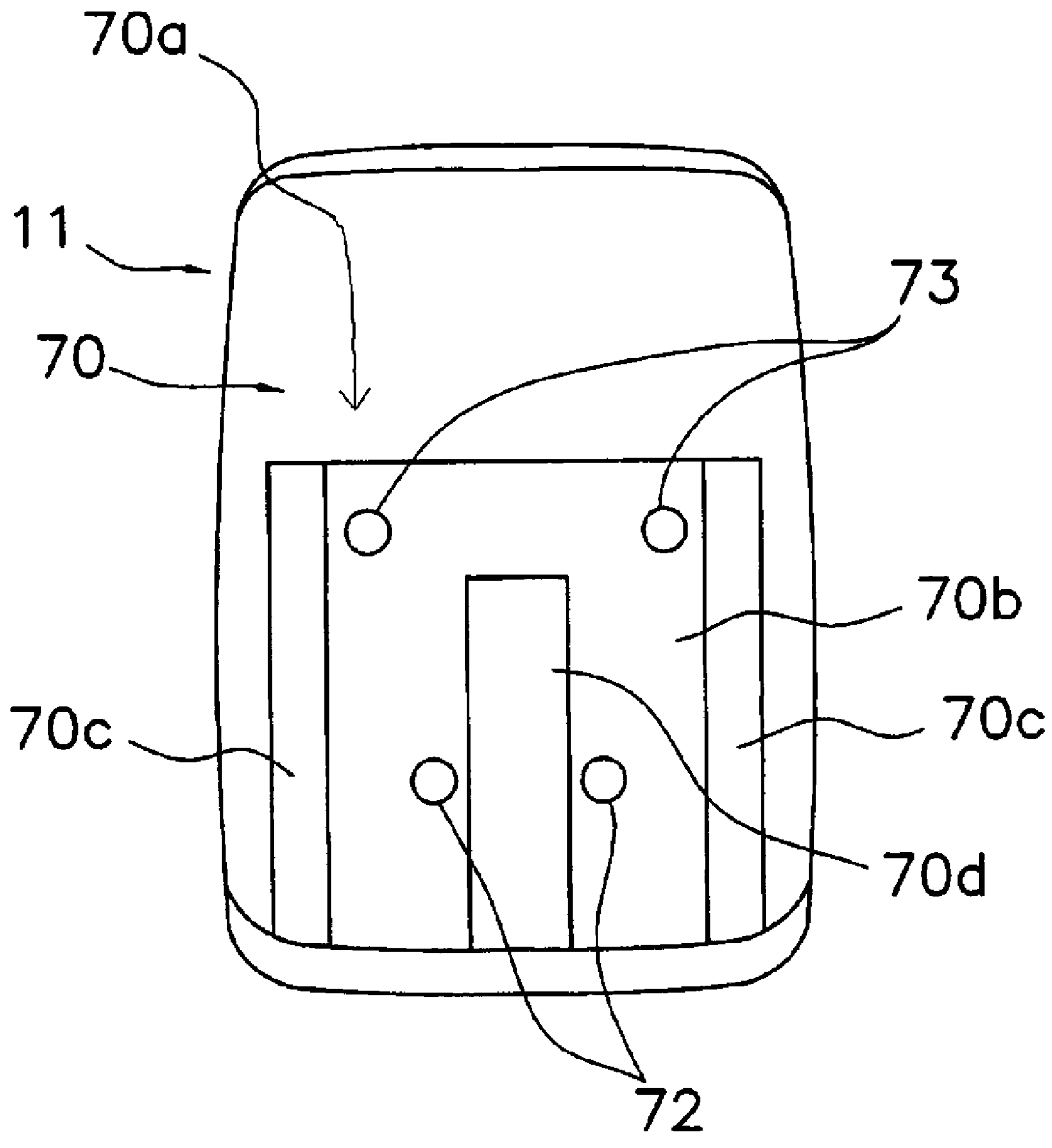
FIG. 5 is a bottom view of a particular embodiment of the cycle computer.

As shown in FIGS. 3, 5 and 6, cycle computer 11 comprises a rounded rectangular display case 70 and a liquid crystal display 71. The bottom surface of display case 70 forms a display case mounting unit 70*a* including a downwardly protruding mounting latch 70*b,* a pair of laterally protruding latch hooks 70*c,* and a hook 70*d.* Mounting latch 70*b* engages the recessed portion of lighting case mounting unit 42, latch hooks 70*c* engage the corresponding mounting slits 42*a,* and hook 70*d* engages mounting latch 42*b.* A pair of hemispherical-shaped exposed electrical data contacts 72 and a pair of hemispherical-shaped exposed electrical power contacts 73 are disposed at the bottom of mounting latch 70*b.* Contacts 72 straddle hook 70*d,* and contacts 73 are disposed adjacent to latch hooks 70*c.* Thus, when display case mounting unit 70*a* is mounted to lighting case mounting unit 42, data contacts 72 contact data contacts 42*c,* and power contacts 73 contact power contacts 42*d* as shown in schematically in FIG. 7.

Display 71 may be a liquid crystal display disposed on the upper surface of display case 70. Display 71 is capable of displaying the bicycle's speed and running distance in a known manner. A backlight comprising LED's, electroluminescent panels, etc may be provided in display 71 in order to render the information visible even in darkness.

As shown in FIG. 7, a display control unit 75 is disposed within display case 70. Display control unit 75 may comprise a microcomputer that calculates speed and distance traveled based on the speed indicating signals received from lighting control unit 45 and also controls the information presented on display 71, including the calculated speed and distance. A mode key 76 and a selection key 77 are connected to display control unit 75 and are exposed on the surface of display case 70. Mode key 76 is used to set various display modes and operating parameters. Selection Key 77 is used to select values used in the display modes and operating parameters.

Cover 43 is installed in order to protect lighting case mounting unit 42 when cycle computer 11 is not mounted to lighting case 40. Cover 43 mounts onto lighting case mounting unit 42 in the same manner as cycle computer 11. In other words, cover 43 comprises a convex portion (not shown in figures) that engages the mounting slits 42*a* formed in lighting case mounting unit 42. Latch 42*b* of lighting case mounting unit 42 latches the rear of cover 43 to lighting case mounting unit 42.

When mounting cycle computer 11 onto lighting case 40, cover 43 is first removed from lighting case mounting unit 42 so that the various mounting elements of lighting case mounting unit 42 are exposed. Then, latch 42*b* in lighting case mounting unit 42 is pushed by hook 70*d* in display case mounting unit 70*a* so that hook 70*d* can slide into latch groove 42*e.* At that time, latch hooks 70*c* of display case mounting unit 70*a* slide into engagement with mounting slits 42*a* in lighting case mounting unit 42. When display case mounting unit 70*a* is slid all the way within lighting case mounting unit 42, latch 42*b* latches the rear edge of hook 70*d,* thus detachably but securely locking cycle computer 11 to lighting apparatus 10. At this time, data contacts 72 contact data contacts 42*c,* power contacts 73 contact power contacts 42*d,* and speed data and electrical power may be supplied from lighting apparatus 10 to cycle computer 11.

When the bicycle is operated by rotating the pedals, the rotation of front wheel 6 causes dynamo 19 to generate alternating current. Rectifier circuit 63 converts the alternating current to direct current, and the direct current is stored in battery 65. The power stored in battery 65 is supplied directly to lighting control unit 45 and to display control unit 75 through contacts 42*d* and 73, thereby rendering lighting control unit 45 and display control unit 75 operational. Waveform shaping circuit 62 converts the sinusoidal alternating current waveform from dynamo 19 into pulses that correspond to the rate of rotation of front wheel 6. Lighting control unit 45 converts these signals into speed indicating signals and communicates these signals to display control unit 75 through contacts 42*c* and 72. Display control unit 75 then displays the speed information on display 71.

When the degree of ambient brightness decreases to a certain level, light sensor 60 generates signals indicating this fact to lighting control unit 45, and lighting control unit 45 provides signals to light switching circuit 61 to provide power from dynamo 19 to lighting elements 41*a* and 41*b*. If desired, lighting control unit 45 also may provide signals indicating the ambient brightness to display controller 75 through contacts 42*c* and 72, and the backlight of display 71, if provided, may be operated accordingly.

If desired, cycle computer 11 may be removed from lighting apparatus 10 such as when parking, etc. This is done simply by pushing down latch operating tab 42*f* and sliding cycle computer 11 rearwardly to disengage latch hooks 70*c* of display case mounting unit 70*a* from mounting slits 42*a* of lighting case mounting unit 42. Thereafter, cover 43 may be mounted onto lighting case mounting unit 42 in a manner similar to cycle computer 11 so that lighting case mounting unit 42 may be protected.

Lighting case mounting unit 42 allows cycle computer 11 to be mounted on the surface of case 40. As a result, lighting apparatus 10 and cycle computer 11 may be mounted onto handlebar 15 in an organized and simplified manner. The rider may view the information displayed by cycle computer 11 by a minimal amount of downward eye movement. Furthermore, since a special bracket need not be provided for cycle computer 11, the structure of cycle computer 11 is simplified.

Figure 8:
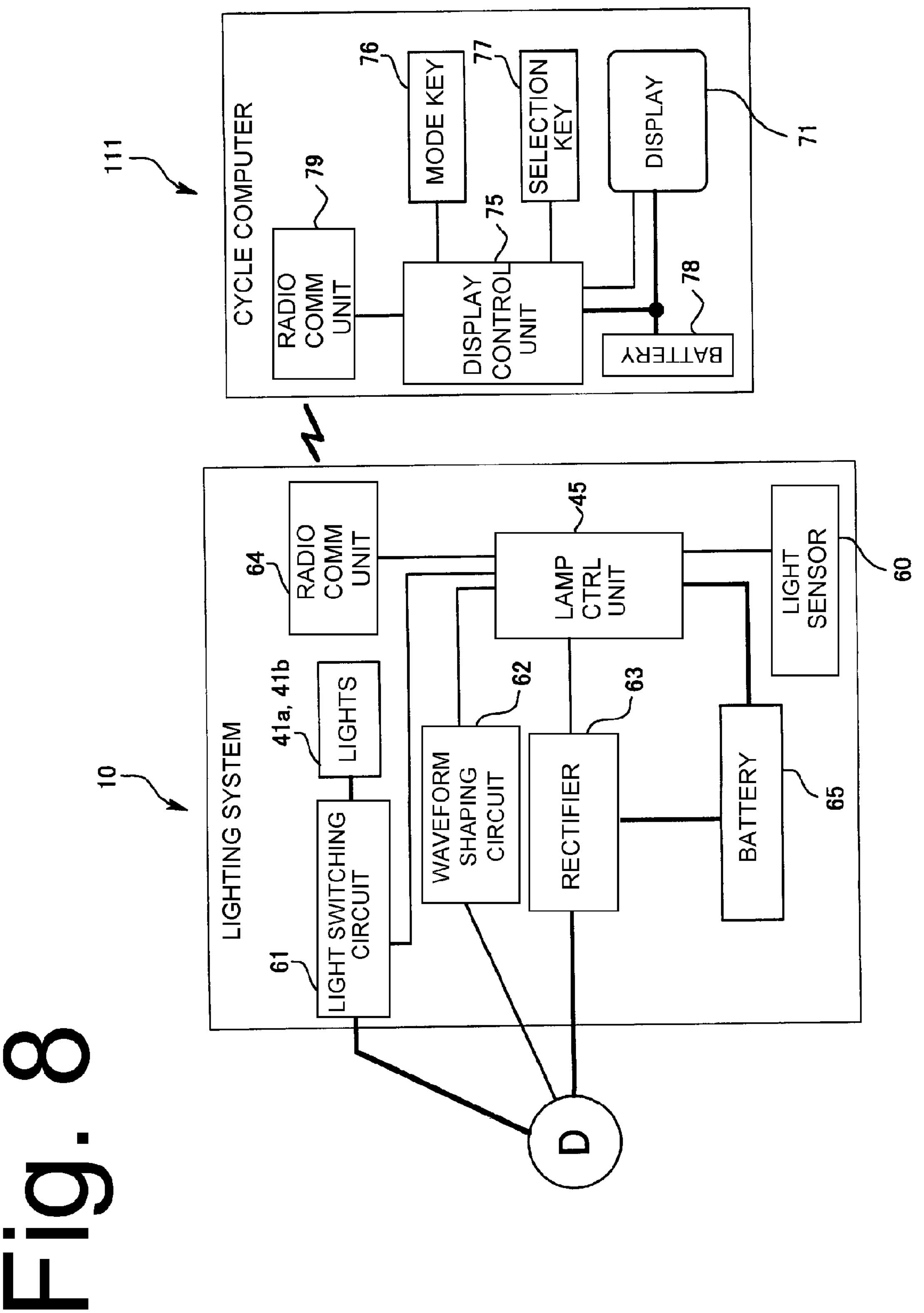
FIG. 8 is a schematic block diagram of another embodiment of components of the lighting apparatus and the cycle computer.

While the above is a description of various embodiments of inventive features, further modifications may be employed without departing from the spirit and scope of the present invention. For example, while data signals were communicated between lighting apparatus 10 and cycle computer 11 through mechanical contacts, FIG. 8 shows a system wherein such information is communicated wirelessly. As shown in FIG. 8, lighting apparatus 10 and cycle computer 11 may be equipped with radio communication units 64 and 79, respectively, to send/receive speed-related signals. In this embodiment, cycle computer 11 may be operated by electricity from a battery 78. Alternatively, electricity may be supplied from lighting apparatus 10 using separate power cords, without using contacts. If desired, the wireless signals sent from lighting apparatus 10 could be signals representing the rotation of front wheel 6 instead of the actual speed information as in the first embodiment. In this case, display controller 75 calculates the speed and distance information from the rotational signals and then displays the information on display 71. The same could be implemented in the first embodiment as well.

Although a xenon bulb and LED's were used as lighting elements in the described embodiments, other lighting elements could be used, such as ordinary electric bulbs, fluorescent lamps, etc. Furthermore, although a front headlight was used as an exemplary lighting element, the teachings herein also could be applied to a flashing locator. The information presented on display 71 could include transmission (e.g., derailleur) gear positions, time, and other information. While lighting case 51 was affixed to bracket 50, case 51 may be structured so as to be detachably mountable to bracket 50. While an alternating current generating dynamo mounted onto the front wheel of the bicycle was used as the power source for lighting apparatus 10 and cycle computer 11, different types of power sources may be employed, such as batteries, etc.

The size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus or emphasis on a particular structure or feature.

What is claimed is:

1. A bicycle lighting apparatus comprising:
- a lighting case structured to be mounted to the bicycle;
- a lighting element supported by the lighting case;
- a lighting case mounting unit disposed on the lighting case and structured to detachably mount a separate display unit to the lighting case so that the display unit is disposed outside of the lighting case when the lighting apparatus is assembled for riding and is detachable from the lighting element and the lighting case without being coupled to either of both the lighting element and the lighting case when the display unit is in the detached state; and
- a lighting control unit supported by the lighting case for electrically controlling the lighting element supported by the lighting case;
- wherein the lighting control unit is supported by the lighting case when the display unit is detached from the lighting case so that the lighting control unit can operate the lighting element when the display unit is removed from the lighting case.

2. The apparatus according to claim 1 wherein the lighting element is disposed within the lighting case.

3. The apparatus according to claim 1 further comprising an external electrical contact disposed on the lighting case.

4. The apparatus according to claim 3 wherein the electrical contact is disposed on the lighting case mounting unit.

5. The apparatus according to claim 4 wherein the electrical contact is structured to communicate data signals.

6. The apparatus according to claim 4 wherein the electrical contact is structured to communicate power signals.

7. The apparatus according to claim 6 further comprising a battery unit coupled to the electrical contact.

8. The apparatus according to claim 1 further comprising an external electrical contact disposed on the lighting case for communicating electrical signals from the lighting control unit.

9. The apparatus according to claim 8 wherein the electrical contact is disposed on the lighting case mounting unit.

10. The apparatus according to claim 1 further comprising a light sensor operatively coupled to the lighting control unit.

11. The apparatus according to claim 10 further comprising a lighting element switching circuit operatively coupled to the lighting control unit to control the operation of the lighting element in response to signals from the lighting control unit.

12. The apparatus according to claim 1 further comprising a converter operatively coupled to the control unit, wherein the converter is structured to convert an alternating current signal to a direct current signal.

13. The apparatus according to claim 12 further comprising a battery unit operatively coupled to the converter for storing electrical power output by the converter.

14. The apparatus according to claim 1 further comprising:
- a battery unit supported by the lighting case;

an external first electrical contact disposed on the lighting case for communicating electrical signals from the lighting control unit; and an external second electrical contact disposed on the lighting case for communicating power signals from the battery unit.

15. The apparatus according to claim 1 wherein the mounting unit comprises a latch for latching the display unit to the lighting case.

16. The apparatus according to claim 1 further comprising:

a display case structured to mount to the lighting case mounting unit; and an electrical display supported by the display case.

17. The apparatus according to claim 16 further comprising:

an external first electrical contact disposed on the lighting case; and an external second electrical contact disposed on the display case so that the first electrical contact contacts the second electrical contact when the display case is mounted to the lighting case mounting unit.

18. The apparatus according to claim 17 further comprising a display control unit supported by the display case for controlling information displayed on the display, wherein the display control unit is a separate control unit from the lighting control unit and remains supported by the display case when the display case is detached from the lighting case.

19. The apparatus according to claim 18 further comprising:

an external third electrical contact disposed on the lighting case; and an external fourth electrical contact disposed on the display case so that the third electrical contact contacts the fourth electrical contact when the display case is mounted to the lighting case mounting unit.

20. The apparatus according to claim 19 wherein the first electrical contact is structured to communicate data signals to the second electrical contact, and wherein the third electrical contact is structured to communicate power signals to the fourth electrical contact.

21. The apparatus according to claim 20 further comprising a display case mounting unit disposed on the display case for mounting to the lighting case mounting unit, wherein the first electrical contact and the third electrical contact are disposed on the lighting case mounting unit, and wherein the second electrical contact and the fourth electrical contact are disposed on the display case mounting unit.

22. The apparatus according to claim 1 wherein the lighting control unit controls the switching of electrical power to the lighting element.

23. A bicycle lighting apparatus comprising:

a lighting case structured to be mounted to the bicycle;

a lighting element supported by the lighting case;

a lighting case mounting unit disposed on the lighting case and structured to detachably mount a separate display unit to the lighting case so that the display unit is detachable from the lighting element and the lighting case without being coupled to either of both the lighting element and the lighting case when the display unit is in the detached state; and a lighting control unit comprising a microprocessor supported by the lighting case for electrically controlling the lighting element supported by the lighting case;

wherein the lighting control unit is supported by the lighting case when the display unit is detached from the lighting case so that the lighting control unit can operate the lighting element when the display unit is removed from the lighting case; and wherein the display unit is detachable from the lighting case without opening the lighting case.

24. The apparatus according to claim 1 wherein the lighting control unit comprises a microprocessor.

25. The apparatus according to claim 18 wherein the display control unit comprises a microprocessor.

26. The apparatus according to claim 18 wherein the lighting control unit comprises a first microprocessor, and wherein the display control unit comprises a separate second microprocessor.

27. The apparatus according to claim 23 wherein the lighting control unit outputs speed data to a location external to the housing in a format so that a separate microprocessor in the display unit calculates bicycle speed from the speed data and controls the information presented on a display of the display unit.

* * * * *